US010356178B2

(12) United States Patent
Pasquie

(10) Patent No.: US 10,356,178 B2
(45) Date of Patent: Jul. 16, 2019

(54) METHOD OF SYNCHRONIZING DATA FOR ALGORITHMS OF ASYNCHRONOUS COMPUTERS OF AN AIRCRAFT

(71) Applicant: Safran Aircraft Engines, Paris (FR)

(72) Inventor: Jean Pasquie, Dammarie les Lys (FR)

(73) Assignee: Safran Aircraft Engines, Paris (FR)

( * ) Notice: Subject to any disclaimer, the term of this patent is extended or adjusted under 35 U.S.C. 154(b) by 1084 days.

(21) Appl. No.: 13/921,454

(22) Filed: Jun. 19, 2013

(65) Prior Publication Data

US 2013/0346632 A1 Dec. 26, 2013

(30) Foreign Application Priority Data

Jun. 22, 2012 (FR) .................................. 12 55966

(51) Int. Cl.
*G06F 9/54* (2006.01)
*H04L 29/08* (2006.01)

(52) U.S. Cl.
CPC ............. *H04L 67/12* (2013.01); *G06F 9/544* (2013.01)

(58) Field of Classification Search
CPC ...... H03M 7/30; H04L 67/12; H04L 67/1095; H04L 67/14; H04L 67/28; H04L 67/2847; H04L 1/1832; G06F 13/4295; G06F 17/30575; G06F 17/30581; G06F 17/30578; G06F 17/30917; G06F 11/2958; G06F 11/2064; G06F 11/2074; G06F 11/2076; G06F 11/2082; G06F 11/208; G06F 3/0643; G06F 9/52; G06F 11/1469; G06Q 30/0277; G06Q 30/0276; H04J 3/1694; H04J 3/0623; H04J 3/076

USPC ....... 370/412, 470, 265, 472, 473, 474, 476, 370/429, 509; 710/30, 36; 711/171;
(Continued)

(56) References Cited

U.S. PATENT DOCUMENTS 5,355,494 A * 10/1994 Sistare .................... G06F 8/443
717/146
5,668,951 A * 9/1997 Jain .......................... H04L 47/10
709/224
5,710,922 A * 1/1998 Alley ........................ G06F 9/52
(Continued)

FOREIGN PATENT DOCUMENTS

EP      2 001 199 A1   12/2008
WO   WO 03/025816 A1   3/2003

OTHER PUBLICATIONS

Andreas Moshovos et al. "Dynamic Speculation and Synchronization of Data Dependences", Computer Architecture, Conference Proceedings, Jun. 2, 1997, pp. 181-193.
(Continued)

*Primary Examiner* — Backhean Tiv
*Assistant Examiner* — Linh T. Nguyen
(74) *Attorney, Agent, or Firm* — Oblon, McClelland, Maier & Neustadt, L.L.P.

(57) ABSTRACT

A method of synchronizing data for algorithms of asynchronous computers in an aircraft, the method comprising the steps consisting in:
 a) generating a sequencing table for each algorithm and, in said table, identifying the number of valid windows for each of which all of the parameters for input to the algorithm are updated at least once;
 b) distributing the load corresponding to updating the parameters for each algorithm in a send table; and
 c) instructing the first computer to use the send table.

13 Claims, 4 Drawing Sheets

(58) Field of Classification Search
USPC ........ 707/620, 610, 803; 709/205, 202, 203, 709/217, 219, 231, 232, 234
See application file for complete search history.

(56) References Cited

U.S. PATENT DOCUMENTS

| | | | | |
|---|---|---|---|---|
| 5,870,759 | A * | 2/1999 | Bauer | G06F 17/30578 |
| 6,101,497 | A * | 8/2000 | Ofek | G06F 11/1451 |
| | | | | 707/657 |
| 6,658,565 | B1 * | 12/2003 | Gupta et al. | H04L 9/00 |
| | | | | 713/135 |
| 7,774,112 | B2 * | 8/2010 | Nahapetian | G07C 5/0808 |
| | | | | 340/436 |
| 2001/0053188 | A1 * | 12/2001 | Kumata | H03M 9/00 |
| | | | | 375/295 |
| 2002/0194207 | A1 * | 12/2002 | Bartlett | G06F 17/30 |
| 2003/0202527 | A1 * | 10/2003 | Nahapetian | H03M 7/30 |
| | | | | 370/412 |
| 2004/0199655 | A1 * | 10/2004 | Davies | H04L 47/10 |
| | | | | 709/231 |
| 2005/0044145 | A1 * | 2/2005 | Quinn | H04L 29/06 |
| | | | | 709/205 |
| 2005/0249156 | A1 * | 11/2005 | Jelavic | H04W 48/16 |
| | | | | 370/329 |
| 2007/0027589 | A1 * | 2/2007 | Brinkley | G06F 17/00 |
| | | | | 701/3 |
| 2007/0106771 | A1 * | 5/2007 | Lucash | H04L 67/1095 |
| | | | | 709/223 |
| 2007/0217763 | A1 | 9/2007 | Siemens et al. | |
| 2009/0063715 | A1 * | 3/2009 | de Cesare | G06F 1/1632 |
| | | | | 710/5 |
| 2011/0246417 | A1 * | 10/2011 | Maya | G06F 17/30 |
| | | | | 707/610 |
| 2012/0185776 | A1 * | 7/2012 | Kirshenbaum | G06F 1/3203 |
| | | | | 715/735 |
| 2013/0159477 | A1 * | 6/2013 | Danielsson | G06F 9/5066 |
| | | | | 709/220 |

OTHER PUBLICATIONS

French Preliminary Search report dated Feb. 14, 2013 in French 12 55966, filed Jun. 22, 2012 ( with English translation of Category of Cited Documents).

* cited by examiner

44

|  | Algo 1 SEQUENCING TABLE |  |  |  |  |  |  |  |  |  |  |  |  |  |  |  |
|---|---|---|---|---|---|---|---|---|---|---|---|---|---|---|---|---|
| 1 | 0 | 1 | 0 | 1 | 0 | 1 | 0 | 1 | 0 | 1 | 0 | 1 | 0 | 1 | 0 | N1 |
| 0 | 0 | 0 | 0 | 0 | 0 | 0 | 1 | 0 | 0 | 0 | 0 | 0 | 0 | 0 | 1 | T3 |
| 0 | 0 | 0 | 0 | 1 | 0 | 0 | 0 | 0 | 0 | 0 | 0 | 0 | 0 | 0 | 0 | EOT |
| 1 | 2 | 3 | 4 | 5 | 6 | 7 | 8 | 9 | 10 | 11 | 12 | 13 | 14 | 15 | 16 | Minor frame |

| | | | | Algo 1 | | | | | | | | | | | | |
|---|---|---|---|---|---|---|---|---|---|---|---|---|---|---|---|---|
| 1 | 0 | 1 | 0 | 1 | 0 | 1 | 0 | 1 | 0 | 1 | 0 | 1 | 0 | 1 | 0 | N1 |
| 0 | 0 | 0 | 0 | 0 | 0 | 0 | 1 | 0 | 0 | 0 | 0 | 0 | 0 | 0 | 1 | T3 |
| 0 | 0 | 0 | 0 | 1 | 0 | 0 | 0 | 0 | 0 | 0 | 0 | 0 | 0 | 0 | 0 | EOT |
| 1 | 2 | 3 | 4 | 5 | 6 | 7 | 8 | 9 | 10 | 11 | 12 | 13 | 14 | 15 | 16 | Minor frame |

Results

1   F F F F T F F F F F F F F F F F   Algo 1

| Results | 1 | 2 | 3 | 4 | 5 | 6 | 7 | 8 | 9 | 10 | 11 | 12 | 13 | 14 | 15 | 16 | Minor frame |
|---|---|---|---|---|---|---|---|---|---|---|---|---|---|---|---|---|---|
| 1 | F | F | F | F | T | F | F | F | F | F | F | F | F | F | F | F | Algo 1 |
| 2 | F | F | F | F | F | F | T | F | F | F | F | T | F | F | F | F | Algo 2 |
| 3 | F | F | F | T | F | F | F | F | T | F | F | F | T | F | F | F | Algo 3 |
| 3 | F | F | F | F | F | F | F | F | F | F | F | F | T | T | T | F | Algo 4 |

52

Algo 1

| F | F | F | F | T | F | F | F | F | F | F | F | F | F | F | F |
|---|---|---|---|---|---|---|---|---|---|---|---|---|---|---|---|

Fig. 6

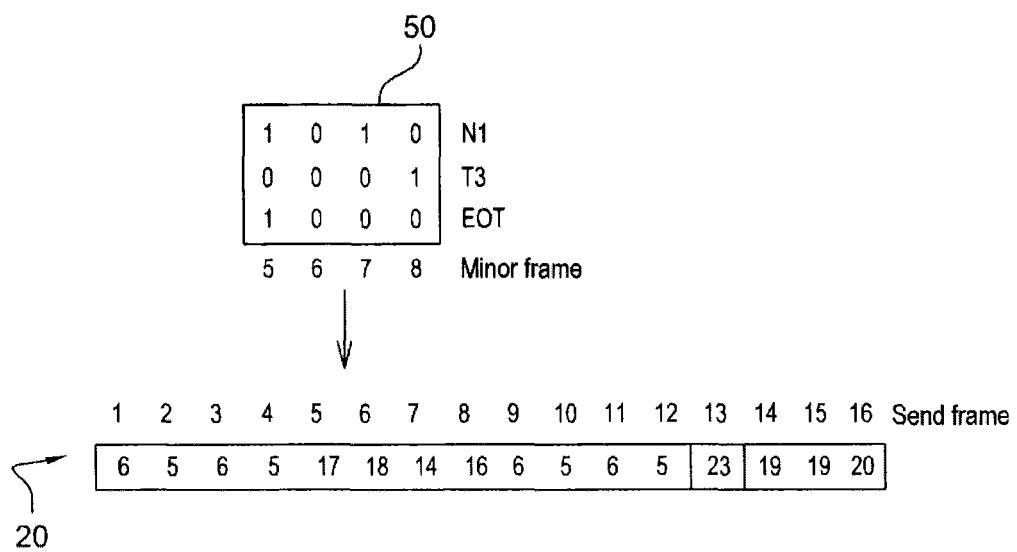

METHOD OF SYNCHRONIZING DATA FOR ALGORITHMS OF ASYNCHRONOUS COMPUTERS OF AN AIRCRAFT

The present invention relates to a method of synchronizing data for algorithms of asynchronous computers in an aircraft.

The asynchronous computers of an aircraft are connected together by a communication interface for transferring the data generated by a first computer to a second computer that has one or more algorithms, each of which makes use of one or more parameters in said data.

By way of example, the first computer is a computer of the engine control and regulation system (ECPS) type serving to acquire an generate engine data, i.e. data coming from or going to engines of the aircraft, which engines are generally turbine engines. The second computer may for example be of the engine monitoring system (EMS) type with the function of sending information to the cockpit of the aircraft and of predicting engine failures. The computers may communicate with each other via a serial communication interface of the RS422 type.

Concerning predicting engine failures, the EMS computer makes use of engine parameters or data as generated by the ECPS computer for feeding its on-board algorithms. In order to guarantee that these algorithms operate correctly, it must be possible to ensure that all of the parameters input to any given algorithm are mutually synchronized in order to ensure time consistency for the events being monitored.

Nevertheless, the EMS and ECPS computers are not synchronized, which means that, without requiring additional information, the EMS computer has no way of knowing the time at which a parameter was generated by the ECPS computer, nor the frequency at which it is generated. Consequently, if two parameters from the ECPS computer are generated at different instants, but both sent at the same moment to the EMS computer, it will associate those two parameters as having the same time.

The communication data rate between the two computers via the RS422 interface is insufficient either for enabling all of the data from the ECPS computer needed by the EMS computer to be sent as soon as it is prepared, or for sending time-stamp and identification information so as to enable the EMS computer to organize the data it receives in the correct time context.

There therefore exists a real need to guarantee that parameters coming from a first computer and transmitted to a second computer are mutually synchronized, while also optimizing the communication data rate between the computers.

Solutions are known that enable parameters to be exchanged between two non-synchronized computers so as to guarantee that the computer that receives the parameters is indeed capable of organizing each parameter in the proper time context.

When selecting and designing the communication interface between the computers, a first solution consists in ensuring that the capacity of the interface enables the first computer to send the time-stamp information relative to the parameters it prepares together with those parameters themselves. This enables the second computer to reorganize the parameters in the proper preparation time context, regardless of the instant at which it receives a parameter.

Nevertheless, that solution requires "non-functional" information to be added to the data that is exchanged between the two computers. That requires a communication interface to be available that is dimensioned with advanced knowledge about the quantity of useful data that needs to be transmitted (the number of parameters and/or parameters). Such advance knowledge would make it possible to estimate the additional load represented by the time-stamp information and thus to provide an interface capable of sending all of that information. Nevertheless, it is not always possible to envisage using that solution, in particular when an RS422 type communication interface is used, as explained above.

When designing the communication interface, another solution consists in ensuring that its capacity enables the first computer to send all of its parameters within a fixed time period after they have been prepared, with this time period being common to all of the parameters. Yet another solution consists in identifying each of the parameters sent and in generating timing tables. For example, the first computer sends a parameter identified by a label equal to 110, and the second computer can restore that parameter to its proper context by using a table containing the generation information and the sending information.

In those two solutions, the ways in which the computers are designed are very closely linked, since one of them needs to have knowledge about the operation of the other. However that is not desirable, nor is it even always possible. The life cycle of each of the computers need not be the same, and the fact that the first computer needs to know the instants at which parameters were prepared and sent is particularly constricting and difficult to change. It needs no more than a change in the sequencing with which parameters are prepared in the first computer for it also to be necessary to change the operation of the second computer, i.e. a non-functional change in the first computer (same perimeter, but implementation slightly changed) can have a functional impact on the second computer (since the algorithms would otherwise no longer have the appropriate input data).

The present invention proposes a solution to this problem of the prior art that is simple, effective, and inexpensive.

A method of synchronizing data from a first computer in an aircraft for transfer to a second computer of the aircraft, the computers being asynchronous and connected together by a communication interface for transferring parameters generated by the first computer to the second computer, which second computer has at least one calculation algorithm receiving at least some of said parameters as inputs, the data synchronization method being characterized in that it comprises the steps consisting in:

a) for said algorithm, generating a sequencing table that comprises, for each input parameter for that algorithm, a finite number of minor frames of the same duration, each containing information about the updating of the corresponding parameter during that duration; then identifying in the sequencing table the number of valid windows containing a number N of successive minor frames in which all of the parameters for input to the algorithm are updated at least once, the number N being determined as a function of the synchronization need and of the duration of a minor frame;

b) distributing the load corresponding to updating the data for the algorithm among N successive send frames of a send table, the positions of these N successive send frames being determined from the position of the, or one of the, above-mentioned valid windows of the sequencing table of the algorithm; and c) instructing the first computer to use the send table.

The method of the invention thus makes it possible for the first computer to be instructed to use the list of input parameters for the algorithms of the second computer together with the frequency with which those parameters should be refreshed on reception by the second computer.

In the present application, the term "sequencing table" is used to designate a structure of dimension equal to the number of parameters to be sequenced and in which a base element may be a triplet of the type: parameter identifier; index of the first minor frame; and refresh periodicity. The send table may be similar.

For each algorithm, step a) of the method of the invention makes it possible to determine the number of valid windows in which all of the parameters that are inputs for that algorithm are updated at least once within a predetermined duration, referred to as a synchronization level or need. This synchronization need (e.g. 60 milliseconds (ms)) is constant and corresponds to the minimum duration (time lapse) during which all of the parameters input to the algorithm in question are updated at least once. When these parameters are transmitted from the first computer to the second computer within this time lapse, they are considered as being synchronized.

The sequencing table may be in the form of a matrix having a number of rows that is not less than the number of parameters used as inputs to the algorithm in the second computer and is at most equal to the number of parameters generated by the first computer, and a number of columns equal to the number F of minor frames for each parameter. The various minor frames in which the parameters are calculated are all of the same duration, which may be expressed in milliseconds, for example, and each may comprise information about the updating of the corresponding parameter within that duration. This information may be in the form of a 1/0 binary code, where 1 means that the parameter has been updated and 0 means that the parameter has not been updated within the duration of the minor frame under consideration.

The duration of each minor frame in the sequencing table and the synchronization need may both be expressed in milliseconds. When the synchronization need is equal to X and the duration of each minor frame is equal to Y, the or each window will have a duration of X and comprise a number N of successive minor frames (columns) that is equal to X/Y. This window has a number of parameters (rows) equal to the total number of parameters generated by the first computer or to a smaller number, e.g. corresponding to the number of parameters that are to be fed to an algorithm under consideration. When the window has a number of parameters equal to the total number of parameters generated by the first computer, only those parameters that are to be fed to an algorithm under consideration contain updating information ("1" as described above) in the corresponding rows of the sequencing table.

By way of example, the sequencing table may comprise 16 minor frames for each parameter, these minor frames possibly having a duration of 15 ms each. In the above-specified example where the sequencing need is 60 ms, a window has (60/15=4) four successive minor frames.

During step b) of the method of the invention, the load corresponding to updating data for each algorithm is distributed in a send table that is to be used for instructing the first computer.

The send table comprises the list of input parameters for each of the algorithms of the second computer, together with the refresh frequency at which they are to be received. The send table may have H send frames, each of which is preferably of the same duration as the minor frames from which the data of the sequencing table is calculated. Each of the send frames has a prior load, e.g. due to parameters that have already been sequenced and/or to other parameters that are used by other functions sharing the same communication interface. This load may be expressed by a number, and the greater the number, the greater the load in the corresponding send frame. The higher the sum of the loads in the send frames, the greater the total load of the communication interface.

The profile of prior loads in frames of the send table can be predetermined by calculation. One method of distributing the load consists in determining which send frame has the smallest number of associated parameters from among the existing frames (detecting an overall minimum). It is possible to envisage using standard deviation methods based on calculating the mean load on each iteration (i.e. after sequencing a parameter), and to determine which send frames have the largest standard deviation. This may make it possible to have a final profile that is more uniform. The method described herein does not require any particular solution for performing this function.

When the algorithm under consideration has n input parameters and each parameter is updated at least once (at least one "1") in the above-mentioned window, the load for distributing in step b) is at least n loads. It is possible that in the time lapse corresponding to the above-mentioned window, at least one parameter is updated more than once. When a parameter for the algorithm is updated two or three times in the window, the load to be distributed in step b) is at least n+1 or n+2 loads.

The positions of the above-mentioned successive send frames of the send table in which the load is distributed in step b) are preferably identical to the positions of the successive minor frames of the window under consideration in the sequencing table. By way of example, when the valid window under consideration has p send frames with the first of them being in the fifth position, then the load is distributed over the p successive minor frames of the send table starting with the minor frame in the fifth position.

The load distribution in step b) preferably depends on the prior load of the above-mentioned successive send frames of the send table and on the moments at which the corresponding parameters are updated, in order to smooth the load, of these frames over time and avoid exceeding a load limit value in any of those frames. This limit value depends in particular on the physical capacity of the communication interface. By way of example, the interface may have a capacity of 70 non-Boolean parameters with only 25 of them being allocated to parameters for input to the algorithms of the second computer, the remainder being used for maintenance functions.

Step a) is preferably performed for all of the algorithms before performing step b). This makes it possible to take account of all of the loads to be distributed for all of the algorithms, of the margins for maneuver made available by the valid windows of those algorithms, and also of the prior loads of the send table, prior to performing step b), thus making it possible to optimize this load distribution step.

Advantageously, the method includes, before step b), an additional step consisting in identifying from among the results obtained in step a) as applied to all of the algorithms, the algorithm for which the sequencing table has the smallest number of valid windows and, where appropriate, the first of these windows when the sequencing table has more than one of these windows, step b) including a first substep of distributing the load corresponding to updating the parameters for said algorithm among the N successive minor frames of the send table.

The method may also include additional substeps of distributing loads corresponding to updating parameters for other algorithms among N successive minor frames of the send table, the algorithms being processed by increasing order of the number of valid windows of their sequencing tables.

Instruction step c) may be performed during the design of the first computer, or else it may be performed dynamically by the first computer itself on receiving the characteristics specific to the algorithms of the second computer. The first solution is performed while designing the system and software of the first computer, with the send table being defined and unmodifiable in the first computer. This solution may be preferred over the variant, since the variant presents greater risks and might not be capable of being certified for reasons of operating safety and of design assurance level (DAL) criticality levels within the meaning of the standard D0178-B that sets safety conditions applicable to software on board aircraft.

The method of the invention may include an additional step of verifying that the distributed loads of updates for all of the algorithms do indeed guarantee the synchronization need and do not exceed the capacity of the communication interface, and, where appropriate, of modifying the synchronization need if the result of the verification is negative. Under such circumstances, when this result is negative, the synchronization need may be relaxed so that the chances of successfully transmitting data in synchronized manner are increased (e.g. by increasing the synchronization need from 60 ms to 75 ms).

Compared with the way data is transferred in prior art aviation situations, the method of the invention makes it possible to satisfy a new type of need, namely guaranteeing a level of synchronization for the parameters used by a plurality of functions in another computer. By means of the invention, it is possible to modify only the communication interface between the two computers and to determine the best level of synchronization that can be achieved, with this being limited by the design of the first computer. The synchronization need is not less than the duration of one minor frame (e.g. 15 ms), which means that all of the parameters are updated continuously, and not more than the total duration of all of the F minor frames (16×15 ms=240 ms in the above example).

The method of the invention has the advantage of avoiding any hardware modification since it relies on the same physical communication link having a given data rate, and of avoiding software modifications to the send table, since it has no impact on the periodicities at which parameters are prepared, and no impact on calculation load.

In a particular implementation of the invention, the first computer generates about 200 parameters, most of which are for feeding to a plurality of algorithms in the second computer, there being fourteen of these algorithms. The synchronization need is relatively slack, being about 60 ms, and the communication interface has a capacity that is relatively low compared with the quantity of information that needs to be transferred between the two computers (200 parameters transferred for a capacity of 25 per minor frame). The method of the invention makes it possible to satisfy these needs and can be repeated on each occasion the first computer is modified and/or on each occasion the parameters used by the algorithms of the second computer are modified.

The present invention also provides an aircraft having two asynchronous computers that are connected to each other by a serial communication interface, the aircraft being characterized in that one of the computers is instructed to use a send table generated by executing the above-described method.

The invention can be better understood and other characteristics, details, and advantages thereof appear more clearly on reading the following description made by way of non-limiting example and with reference to the accompanying drawings, in which:

FIG. 4 is a sequencing table for preparing input data for an algorithm of one of the FIG. 2 computers;

FIG. 5 shows a step of identifying a valid window in the FIG. 4 sequencing table;

FIG. 6 shows the results of the identification step of FIG. 5 as applied to all of the algorithms of the computer; and FIGS. 7 and 8 show steps of selecting one of the algorithms and of distributing the loads of preparing the input parameters for that algorithm in a major frame of a send table.

Figure 1:
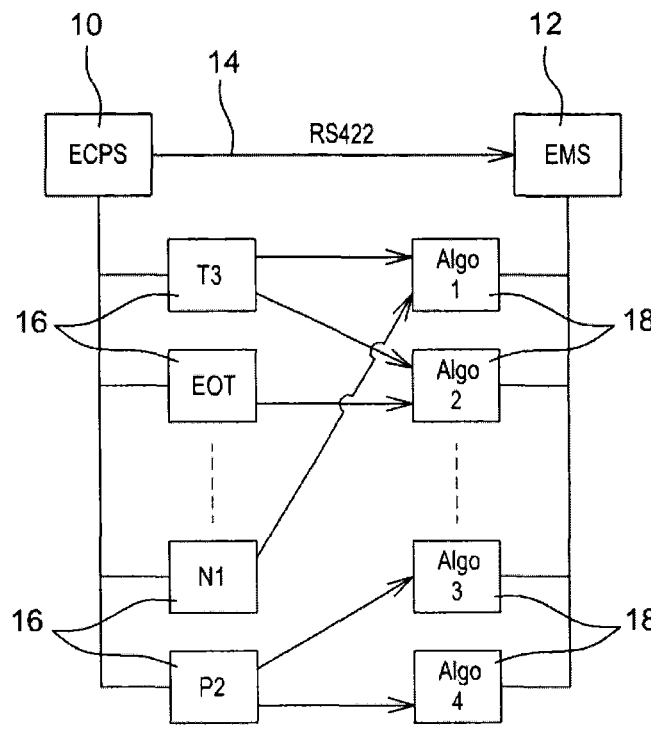
FIG. 1 is a highly diagrammatic view of two asynchronous computers connected together by a serial communication interface, and showing the situation of the prior art.

Reference is made initially to FIG. 1 which shows the technique prior to the invention, in which two asynchronous computers 10 and 12 of an aircraft communicate with each other via a serial communication interface 14 for transmitting parameters 16 from a first one of the computers 10 to the second computer 12 which has algorithms 18 each receiving as inputs all or some of the parameters 16.

In the example shown, the first computer 10 is an ECPS computer having the function of acquiring and generating engine data of the aircraft, and the second computer 12 is an EMS computer having the function of transmitting information to the aircraft cockpit and of predicting engine failures. The serial communication interface 14 in this example is of the RS422 type.

The computer 10 generates parameters 16 (T3, EOT, . . . , N1, and P2) for transmission to the computer 12 in order to be fed to algorithms 18 (Algo1, Algo2, . . . , Algo3, and Algo4) of that computer.

In FIG. 1, the arrows between the parameters 16 from the computer 10 and the algorithms 18 of the computer 12 indicate how the algorithms are dependent on the parameters. In the example shown, the algorithm Algo1 receives the input parameter N1, the algorithm Algo2 receives the input parameters T3 and EOT, while the algorithms Algo3 and Algo4 both receive the input parameter P2.

As explained above, the fact that the computers 10 and 12 are not synchronized means that the parameters 16 transmitted simultaneously by the computer 10 to the computer 12 may be associated with the same time by the computer 12, even though they might have been prepared at different instants by the computer 10.

Figure 2:
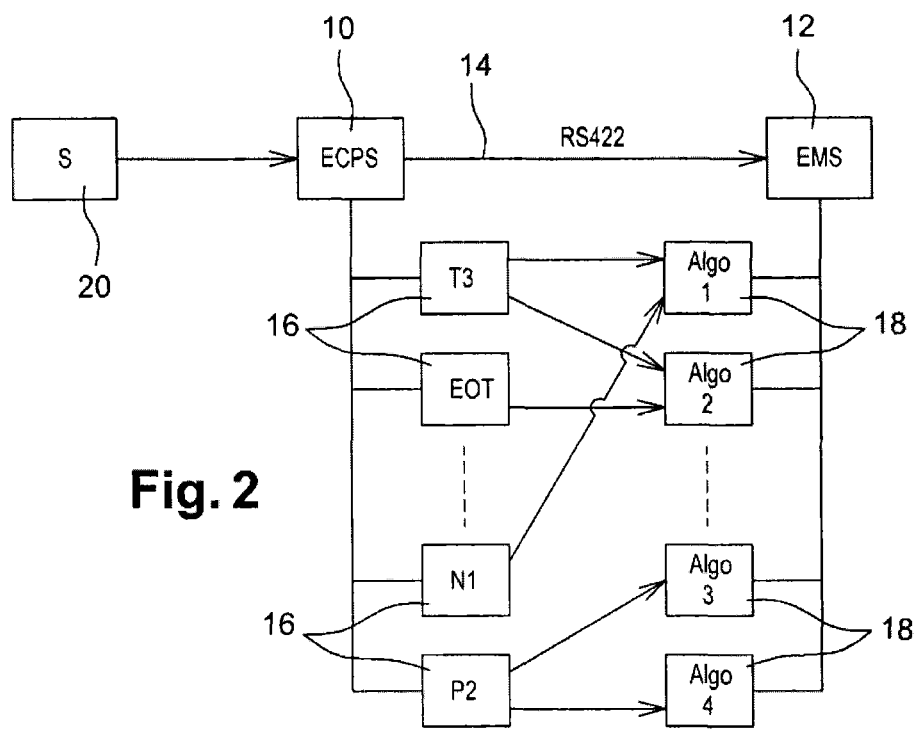
FIG. 2 is a highly diagrammatic view of two asynchronous computers connected together by a serial communication interface, and showing a portion of the method of the invention that includes a step of instructing one of the computers with a specific send table.

The invention enables this problem to be remedied by establishing a send table 20 ("S") that is for instructing the computer 10 and that comprises the list of parameters 16 for each of the algorithms of the computer 12, together with the refresh frequencies at which each parameter is to be received (FIG. 2).

In one particular implementation of the invention, the computer 10 generates about 200 parameters 16 some of which are for feeding to a plurality of different algorithms 18 of the computer 12, which computer has fourteen algorithms. The serial communication interface 14 has a capacity of 70 Boolean parameters, of which only 25 are allocated to the parameters for the algorithms of the computer 12, while the remainder are used for maintenance functions.

It is the algorithms 14 that define which parameters need to be mutually synchronized. The algorithms need to receive each parameter at a certain periodicity or frequency, and some of those parameters may be shared between a plurality of algorithms.

Figure 3:
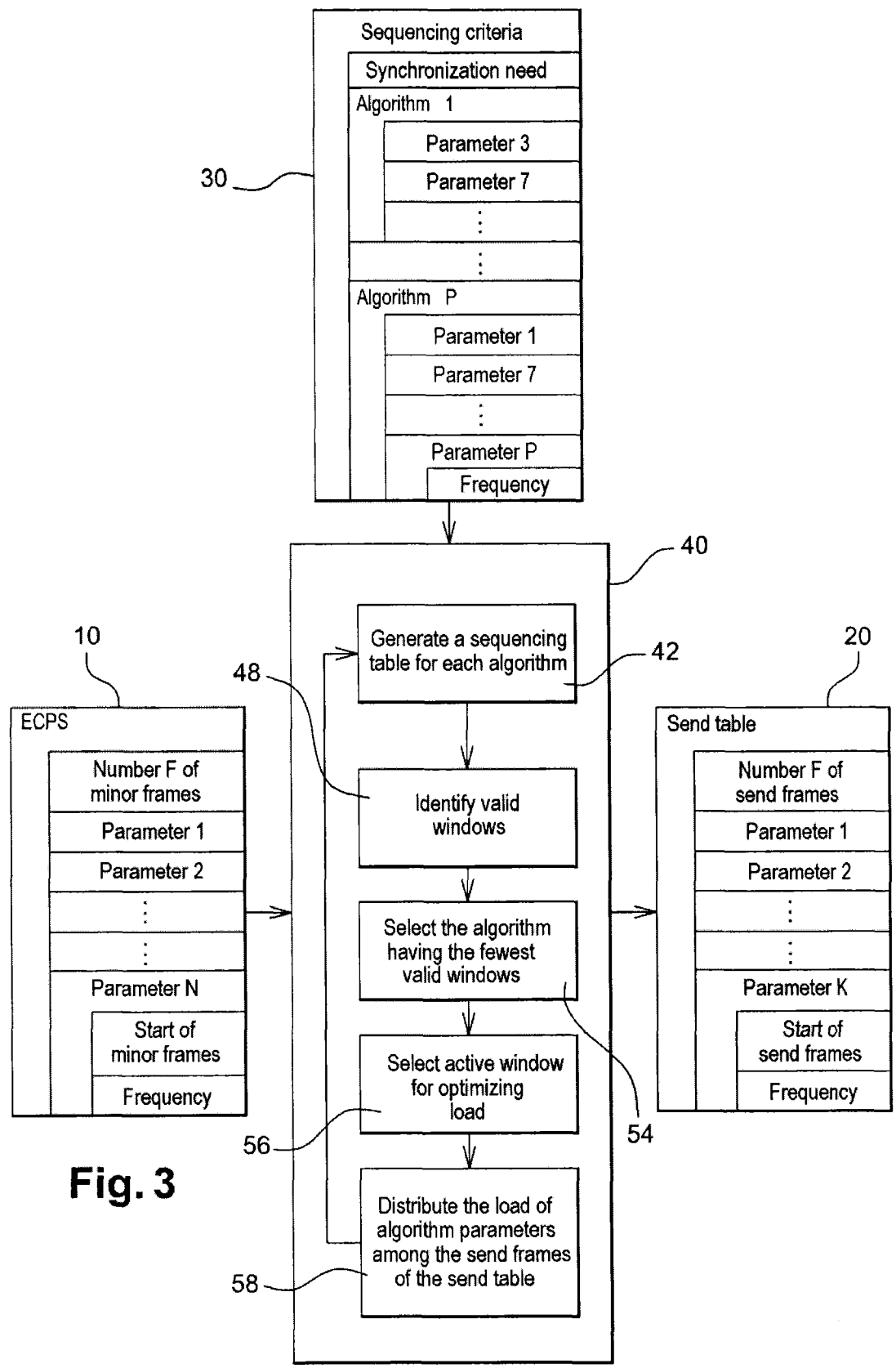
FIG. 3 is a flow chart showing other steps of the method of the invention.

FIG. 3 is a flow chart showing the steps of the method of the invention in diagrammatic manner, the flow chart having four blocks respectively representing the computer 10, the sequencing criteria 30, sequencing steps 40, and the above-mentioned send table 20.

The computer 10 cycles through a number F of minor frames, each of which has the same duration. Each parameter generated by the computer 10 is executed on F minor frames. As is explained in greater detail, the minor frames of each parameter comprise information about the instants and the frequency at which the parameter is prepared or updated.

The sequencing criteria 30 comprise a synchronization level or need together with, for each algorithm, the list of parameters that are input to that algorithm and the frequency at which they should be prepared. In this example, synchronization need is expressed in milliseconds.

The sequencing steps 40 of the method of the invention are described below with reference to FIGS. 4 to 8.

A first step 42 consists in establishing or generating a sequencing table for preparing parameters for each algorithm of the computer 12.

FIG. 4 shows the sequencing table 44 of the first algorithm (Algo1) of the computer 12 in a diagrammatic manner. The table 44 comprises a number of rows or major frames equal to the number of parameters input to the first algorithm, which number is three in the example shown. The three parameters input to the algorithm in this example are N1, T3, and EOT. Each row comprises the number of minor frames through which the computer 10 cycles, which in this example is sixteen. Each of these minor frames has a duration of 15 ms.

The sequencing table is thus made up of a matrix of three rows of sixteen columns. Each minor frame includes information about the preparation or updating of the corresponding parameter during the duration of the minor frame, and together the minor frames for a particular parameter provide information about the frequency with which that parameter is prepared or updated.

The data from the computer 10 is prepared for the first time in a given minor frame (between the first and the sixteenth), at a given periodicity (with the information about the first update and the periodicity being defined for each parameter generated by the computer during design of the software). In the example shown, the first update of the parameter N1 takes place at instant t0 and this parameter is updated once every 30 ms. The first update of the parameter T3 takes place at instant t0+105 ms (minor frame number 8) and this parameter is updated once every 120 ms. The first update of the parameter EOT takes place at instant t0+60 ms (minor frame number 5) and this parameter is updated once every 240 ms.

Another step 48 of the method consists in identifying at least one valid window 50 in the sequencing table 44 for each algorithm, this window having a number of columns that is a function of the above-mentioned synchronization need of the sequencing criteria and a number of rows that is a function of the number of parameters for the algorithm in question (FIG. 5).

When the synchronization need is 60 ms and each minor frame has a duration of 15 ms, the window 50 has four columns and three rows for the first algorithm which has three input parameters. It is assumed that all of the algorithms have the same synchronization need for their respective parameters.

A window is said to be valid if it includes at least one update (i.e. at least one "1") for each of the parameters of the algorithm. In order to satisfy this synchronization need, it is necessary for the parameters to be updated during the time lapse of the window and for them to be sent before the end of the time lapse, i.e. no later than the last minor frame of the window. In order to determine the positions and the number of the windows 50, it is possible to proceed by "sliding". The first window (lying in the range minor frames Nos. 1 to 4) is then selected, and it is determined whether, in this window, the parameters for the algorithm are all updated at least once. If not, the result of this analysis is negative ("F") and that result may be given to the first minor frame of the results major frame 52 specific to the algorithm in question. The second window (lying in the range minor frames Nos. 2 to 5) is then selected and it is likewise analyzed whether, in this window, the parameters for the algorithm have all been updated at least once. Since they have not, the result "F" of this analysis is given to the second minor frame of the results major frame 52. These operations are repeated for all of the windows of the sequencing table of the algorithm.

In the example shown in FIG. 5, it can be seen that there is only one valid window 50 identified, and it can also be seen that the parameter N1 is updated twice within that window (in minor frames Nos. 5 and 7), while the parameter T3 is updated once in minor frame No. 8 and the parameter EOT is updated once in the minor frame No. 5. The results frame 52 has only one positive result "T", situated at minor frame No. 5, which means that the identified valid window 50 begins at minor frame No. 5 of the sequencing table 44.

The above-mentioned steps 42 to 46 are repeated for each algorithm of the computer 12. They are thus performed fourteen times in the above-described example where the computer has fourteen algorithms.

The following step 54 consists in identifying the algorithm for which the sequencing table of its parameters has the fewest valid windows 50. This algorithm has the least choice for defining the sequencing of its parameters. The first step is thus to distribute the load resulting from this sequencing.

FIG. 6 shows the results frames 52 from the preceding step for four algorithms (Algo1 to Algo4). It can be seen that the sequencing table of the first algorithm (Algo1) has only one valid window (beginning at the minor frame No. 5), that the sequencing table for the second algorithm (Algo2) has two valid windows (beginning at minor frames Nos. 7 and 12, respectively), that the sequencing table for the third algorithm (Algo3) has three valid windows (beginning at minor frames Nos. 4, 9, and 13, respectively), and that the sequencing table for the fourth algorithm (Algo4) has three valid windows (beginning at minor frames Nos. 13, 14, and 15, respectively).

In the present example, step 54 consists in selecting the algorithm Algo1 for which load distribution is to be performed first, i.e. for which parameters are to be distributed within a determined time lapse.

When the selected algorithm sequencing table has two or more valid windows, an optional step 56 consists in selecting one of those windows. This step is described in greater detail below.

The following step 58 consists in distributing the load corresponding to the updating of the parameters for the algorithm Algo1 in the send table 20.

The send table 20 has H send frames, where the number H of these frames in this example is equal to the number F of the minor frames of each row in the sequencing table for an algorithm, i.e. 16 in the above example. Each of these send frames likewise has a duration of 15 ms.

Each send frame of the send table has a load corresponding to the sum of a plurality of parameters that are to be transmitted by the computer 10 to the computer 12 at a given instant.

Concerning the load specific to the parameters of the algorithm Algo1, the step 58 consists in distributing this load among the send frames of the send table 20 corresponding to the minor frames of the previously selected valid window. Since the selected valid window begins at minor frame No. 5, the send frames of the send table in which the load is to be distributed are the N successive send frames beginning at the frame No. 5 (N corresponding to the number of minor frames in the window under consideration), i.e. the frames Nos. 5, 6, 7, and 8.

The updates of the valid window 50 are then shared among the four successive frames (Nos. 5 to 8) of the send table 20. In the present example, each of these frames already includes a load which is 17 for frame No. 5, 17 for frame No. 6, 13 for frame No. 7, and 15 for frame No. 8 (FIG. 7).

The parameter N1 is updated at t0 and is updated again at t0+30 ms, so this parameter is thus available as from t0 and may be transmitted at send frame No. 5, 6, 7, or 8 in the send table. Parameter T3 is updated at t0+45 ms and therefore cannot be transmitted until send frame No. 8, and the parameter EOT can also be sent in send frames Nos. 5, 6, 7, and 8 since it is already available at t0.

The load corresponding to updating the parameter T3 is therefore necessarily sent in send frame No. 8 of the send table 20, which brings the overall load for this frame to 16 (FIG. 8). It is decided to allocate the load corresponding to updating the parameter N1 to the send frame No. 7 of the send table 20 (thereby raising the overall load for this frame to 14) since this parameter is updated in send frame No. 7 in the sequencing table. Finally, the load corresponding to updating the parameter EOT is allocated to send frame No. 6 of the send table 20, thereby bringing the overall load of this frame to 18. No load relating to updating the parameters for algorithm Algo1 is therefore transmitted at send frame No. 5.

The loads corresponding to the data updates for the other algorithms are then distributed one after another by repeating the steps 54, 56, and 58 for all of the algorithms. Because of above-mentioned step 54, the distribution of the loads for the algorithms is processed by increasing order of the number of valid windows in their sequencing tables. In the implementation of FIG. 6, the loads for the algorithm Algo2 (which has two valid windows in its sequencing table) are shared after sharing the loads for the algorithm Algo1, and load sharing subsequently takes place for the algorithms Algo3 and Algo4 respectively.

When two or more valid windows can be used for transmitting data updates to an algorithm, it is appropriate to select one of those windows in order to perform step 54. By way of example, it is possible to select the first-identified valid window, i.e. the valid window in which the first minor frame has the lowest number. With algorithm Algo2, which has two valid windows, it is for example the first window that is selected, i.e. the window beginning at minor frame No. 7. In a variant, this window may be selected by taking account of the prior loads of the corresponding send frames of the send table.

When parameters are common to two or more algorithms, it is advantageous to avoid sequencing once again a parameter that has already been sequenced for one of those algorithms and for which the instant at which that sequencing took place is compatible with the valid window of the other algorithm that is to receive this parameter.

Each parameter is then sequenced for sending at a given periodicity and by means of a first-send send frame.

In general, load distribution may be performed so as to smooth the overall load over the send frames, i.e. so as to distribute this overall load over time without exceeding a load limit value for any of the frames.

After distributing loads for all of the algorithms, the method of the invention may include a step of verifying that all of distributed loads do indeed guarantee the synchronization need and do not exceed the capacity of the communication interface.

In the above example, it is verified that the parameters are sequenced while complying with the synchronization need, and it can be seen that the maximum capacity of the communication interface is not reached (after distributing the data loads for the algorithm Algo1), with the highest load (data rate peak) in the send frames being 23, which is lower than the above-mentioned limit value of 25. If one of the above-mentioned criteria is not satisfied, the method may re-iterate all of the above-mentioned steps while modifying the synchronization need, e.g. from 60 ms to 75 ms (thereby enlarging the windows, and increasing possibilities for distributing loads in the send table, and thus increasing the chances of synchronizing the data for the algorithms).

After the send table 20 has been validated, the computer may be instructed to use this table. This instruction may take place during design of the computer system or it may be performed by the computer itself, which computer is then designed to receive the characteristics of the algorithms of the computer 12 and to generate its own send table dynamically, on the basis of the above-mentioned synchronization criteria.

The method of the invention makes it possible to guarantee that all of the parameters for the algorithms comply with the synchronization need. Nevertheless, it is entirely possible to apply the method of the invention to only a fraction of the algorithms of the computer 12 or to only a fraction of the data for feeding to the algorithms of that computer, and to define a tolerance level making it possible to have at least one valid result for each algorithm (e.g. if 90% of the data for the algorithms of the computer 12 is synchronized, then the sequencing may be found to be valid. This may present the advantage of guaranteeing poor synchronization for certain algorithms but with 100% coverage for them).

The invention claimed is:

1. A method of synchronizing data from a first computer installed in an aircraft to be transferred to a second computer installed in the aircraft, the computers being asynchronous and connected together by a serial communication interface to transfer parameters of the aircraft generated by the first computer to the second computer, the second computer using the parameters of the aircraft as inputs for at least one calculation algorithm, the method comprising:

a) for the at least one calculation algorithm, generating a sequencing table that comprises, for each input parameter of the aircraft for the at least one calculation algorithm, a finite number of minor frames of a same duration, each of the minor frames containing information indicating whether the each input parameter of the aircraft is updated during that duration; then identifying in the sequencing table a number of valid windows, out of a plurality of windows, each window containing a number N of successive minor frames, wherein a valid window includes N successive minor frames that indicate that all of the parameters of the aircraft in that window, which are generated by the first computer installed in the aircraft and are for input to the at least one calculation algorithm, are updated at least once, the number N being determined as a function of a synchronization need and of the duration of a minor frame;

b) distributing a load corresponding to updating the parameters of the aircraft for the at least one calculation algorithm among N successive send frames of a send table, positions of these N successive send frames being determined from a position of one or more of the valid windows of the sequencing table of the at least one calculation algorithm, wherein each send frame of the send table includes a load corresponding to a sum of a plurality of parameters that are to be transmitted by the first computer to the second computer at a given time instant; and c) instructing the first computer installed in the aircraft to use the send table to synchronize the parameters of the aircraft to transfer to the second computer installed in the aircraft.

2. The method according to claim 1, further comprising performing step a) for each of a plurality of algorithms before performing step b).

3. The method according to claim 2, further comprising, before step b), identifying from among results obtained in step a), as applied to all of the algorithms, the algorithm for which the sequencing table has a smallest number of valid windows and, where appropriate, the first of these windows when the sequencing table has more than one of these windows, the step b) further including a first substep of distributing the load corresponding to updating the parameters of the aircraft for the at least one calculation algorithm among the N successive minor frames of the send table.

4. The method according to claim 3, wherein
step b) includes distributing loads corresponding to updating parameters of the aircraft for other algorithms among N successive minor frames of the send table, the algorithms being processed by increasing order of the number of valid windows of their sequencing tables.

5. The method according to claim 1, wherein
the instructing step c) is performed during design of the first computer installed in the aircraft, or dynamically by the first computer itself on receiving characteristics specific to algorithms of the second computer installed in the aircraft.

6. The method according to claim 1, wherein
positions of the successive minor frames of the send table among which the load is distributed in step b) are identical to the positions of the successive minor frames of a window under consideration in the sequencing table.

7. The method according to claim 1, wherein
the load distribution in step b) depends on prior loads of the successive send frames of the send table at a moment when the corresponding parameters of the aircraft are updated, so as to smooth the load of these frames over time and avoid exceeding a load limit value for any of the frames.

8. The method according to claim 1, wherein
the sequencing table has sixteen minor frames for each parameter of the aircraft, these minor frames having a duration of fifteen milliseconds each.

9. The method according to claim 1, further comprising: verifying that distributed loads of updates for all of algorithms guarantee the synchronization need and do not exceed capacity of the communication interface, and, where appropriate, modifying the synchronization need in response to the result of the verification being negative.

10. An aircraft comprising:
two asynchronous computers that are installed in the aircraft and connected together by a serial communication interface to transfer parameters of the aircraft generated by a first computer of the asynchronous computers to a second computer of the asynchronous computers, wherein
the second computer installed in the aircraft is configured to use the parameters of the aircraft as inputs for at least one calculation algorithm, and
the first computer installed in the aircraft is configured to receive an instruction to use a send table generated for the at least one calculation algorithm, generate a sequencing table that comprises, for each input parameter of the aircraft for the at least one algorithm, a finite number of minor frames of a same duration, each of the minor frames containing information indicating whether the each input parameter of the aircraft is updated during that duration, then identify in the sequencing table a number of valid windows, out of a plurality of windows, each containing a number N of successive minor frames, wherein a valid window includes N successive minor frames that indicate that all of the parameters of the aircraft for input to the at least one calculation algorithm are updated at least once, the number N being determined as a function of a synchronization need and of the duration of a minor frame, and distribute a load corresponding to updating the parameters of the aircraft for the at least one calculation algorithm among N successive send frames of the send table, wherein each send frame of the send table includes a load corresponding to a sum of a plurality of parameters that are to be transmitted by the first computer to the second computer at a given time instant, positions of these N successive send frames being determined from a position of one or more of the valid windows of the sequencing table of the at least one calculation algorithm.

11. The method according to claim 1, further comprising:
before step b), identifying from among results obtained in step a), as applied to each of a plurality of algorithms, the algorithm for which the sequencing table has a smallest number of valid windows and, where appropriate, the first of these windows when the sequencing table has more than one of these windows, the step b) further including a first substep of distributing the load corresponding to updating the parameters of the aircraft for the at least one calculation algorithm among the N successive minor frames of the send table, wherein
the load distribution in step b) depends on prior loads of the successive send frames of the send table at a moment when the corresponding parameters of the aircraft are updated, so as to smooth the load of these frames over time and avoid exceeding a load limit value for any of the frames.

12. The method according to claim 1, wherein
the first computer installed in the aircraft is of an engine control and regulation system (ECPS) type, and the second computer installed in the aircraft is of an engine monitoring system (EMS) type.

13. The method according to claim 1, wherein
the parameters of the aircraft include engine data.

\* \* \* \* \*